United States Patent
Phillips

[15] 3,644,169
[45] Feb. 22, 1972

[54] LAMINATED SLABS OF CHEWING GUM BASE

[72] Inventor: Michael Phillips, North Brunswick, N.J.
[73] Assignee: L. A. Dreyfus Company, South Plainfield, N.J.
[22] Filed: Sept. 9, 1968
[21] Appl. No.: 774,558

Related U.S. Application Data

[62] Division of Ser. No. 334,870, Dec. 31, 1963, Pat. No. 3,455,755.

[52] U.S. Cl. ........................ 99/135, 161/99, 161/149, 161/234
[51] Int. Cl. .................................. A23g 3/00, A23g 3/30
[58] Field of Search ............... 161/234, 99; 99/135, 171, 90; 100/1, 40, 76

[56] References Cited

UNITED STATES PATENTS

| | | | |
|---|---|---|---|
| 3,032,337 | 5/1962 | Holman | 270/79 |
| 2,877,120 | 3/1959 | Bush | 99/171 |
| 3,162,539 | 12/1964 | Repko | 99/171 |
| 1,771,981 | 7/1930 | Mustin | 99/135 |
| 1,771,982 | 7/1930 | Mustin | 99/135 |
| 2,238,342 | 4/1931 | Riehl | 156/289 |
| 2,284,804 | 6/1942 | DeAnglis | 99/135 |
| 2,353,927 | 7/1944 | Pickett | 99/135 |
| 2,635,965 | 4/1953 | Hensgen et al. | 99/171 |
| 2,667,420 | 1/1954 | Meulmans et al. | 99/171 |
| 2,760,871 | 8/1956 | Hensgen et al. | 99/171 |
| 2,762,504 | 9/1956 | Sparks et al. | 206/84 |
| 2,813,798 | 11/1957 | Toby | 99/171 |
| 2,828,211 | 3/1958 | Sanders | 99/193 |

OTHER PUBLICATIONS

Anon; Fed. Register 121.1059 (29FR13894, Oct. 8, 1964) and Sec. 121.1156 relied on.
Barron, Harry, Modern Rubber Chemistry, VanNostrand, New York, (1948) pages 151– 153 relied on.
Whitby, G. S. et al., Synthetic Rubber, Wiley, New York (1954) pages 383 and 1037 relied on.
Warth, A. H. Chemistry and Technology of Waxes, Reinhold Pub. Co., N.Y. (1956), pages 417, 421 and 438 relied on.

Primary Examiner—Willard E. Hoag
Attorney—LeBlanc & Shur

[57] ABSTRACT

A laminated chewing gum base slab comprising a ribbon of chewing gum base in which the ribbon is folded in accordion fashion with the faces of separate folds adhered together. The adjacent faces of some folds can be separated by a nonadherent layer.

3 Claims, 4 Drawing Figures

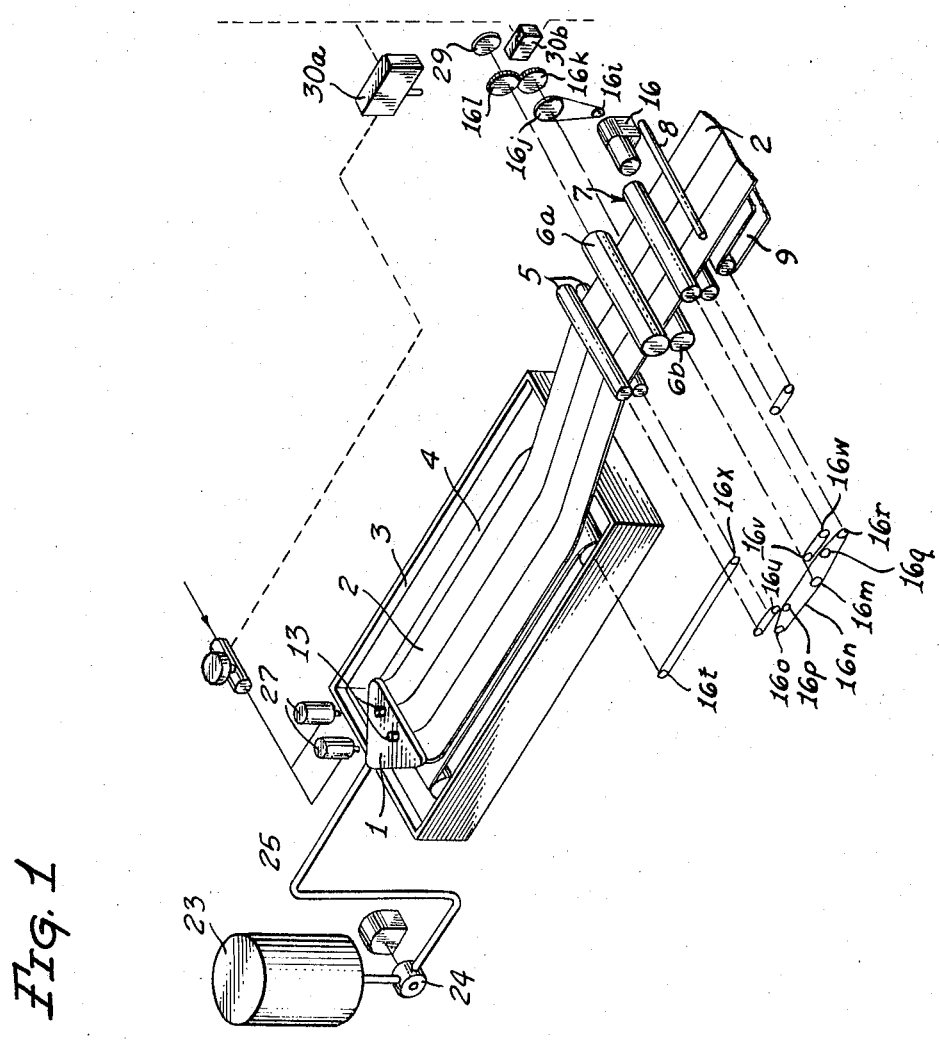

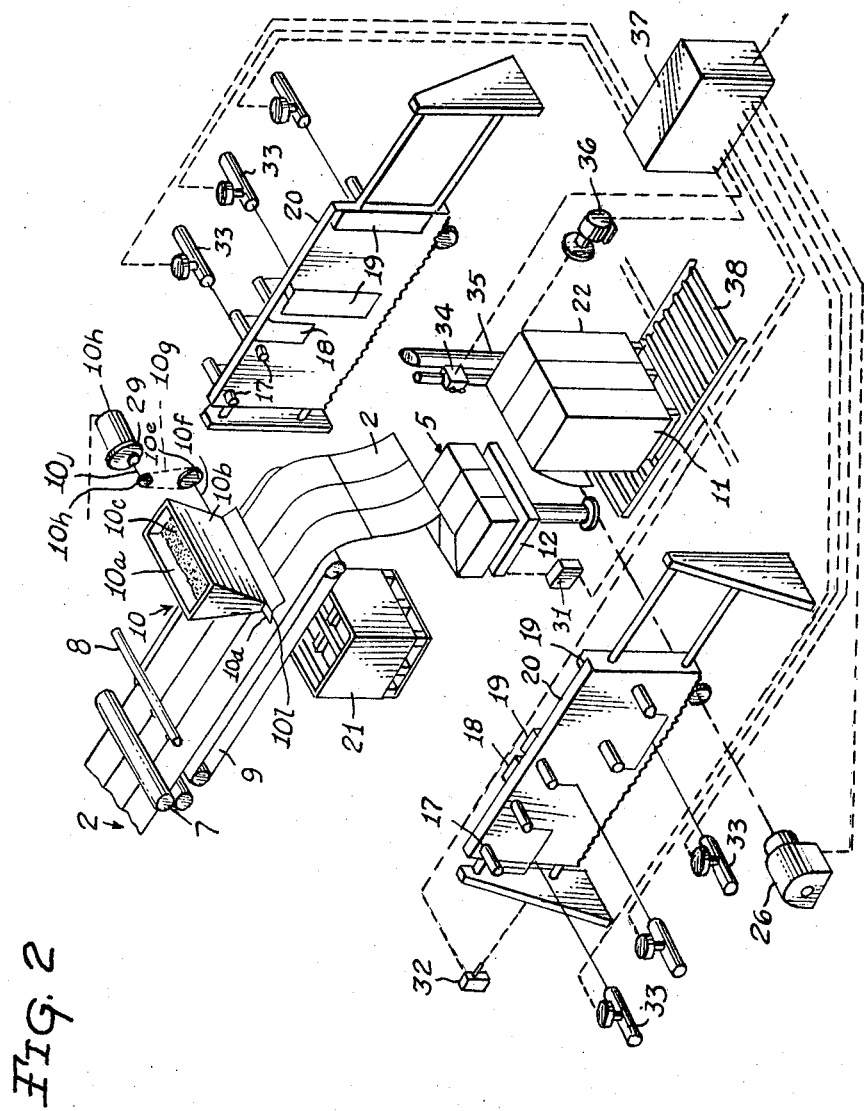

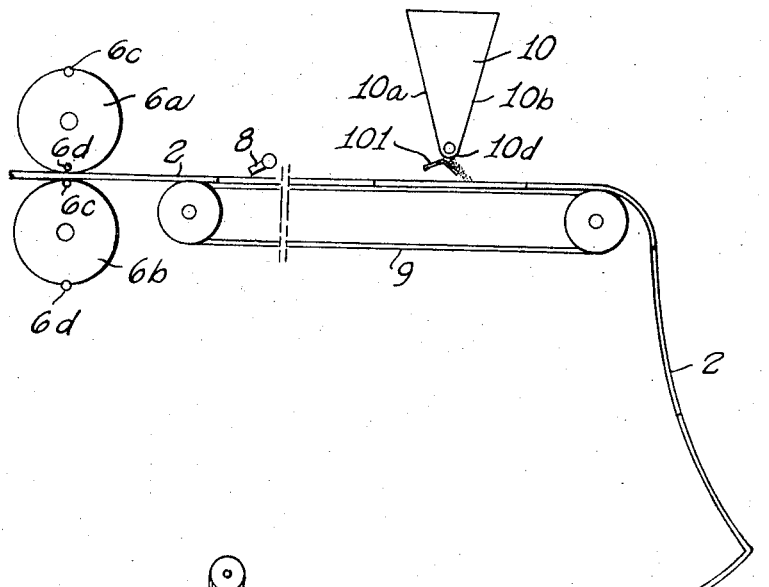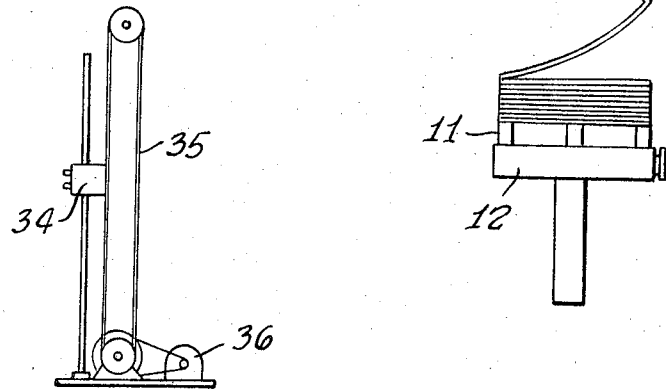

LAMINATED SLABS OF CHEWING GUM BASE

This application is a division of copending application Ser. No. 334,870, filed Dec. 31, 1963, now U.S. Pat. No. 3,455,755.

This invention relates to methods and machines for continuously casting hot viscous melts and producing rectilinear slab forms of such material in any desired thickness by lamination but without the use of pans or molds, and also includes the laminated slabs thus produced.

This invention is especially adapted for advantageous use in the chewing gum base and wax compounding industries. These compounds are most readily transported from the compounding plants to the industrial users in the form of slabs weighing in the neighborhood of 10 to 50 pounds per slab. The slab thickness and dimensions are dictated to some extent by the size and weight which is convenient for the costormer's use.

In the industry, these compounds are mixed in heated vessels and discharged in a molten mass at elevated temperatures above their melting points. The molten mass is converted to solid uniform slabs or blocks of varying size and thickness depending on the customers' needs. The traditional methods, which have long been used in the industry, employ batch-type casting techniques, wherein, the molten material is poured into individual pans, trays, or molds, and left to cool. These molds often have tapered sides and require antistick coatings so that the slabs can be hand-dumped after cooling. The slabs are then hand-stacked onto pallets or in suitable containers for shipment. Over the years, such manual casting techniques have been improved or mechanized by various means, however, they remain batch-type casting methods and as such involve a considerable amount of hand labor in unsticking, cleaning, cooling, and handling of slots. All this is tedious, unsanitary, undignified, and expensive.

U.S. Pat. Nos. 2,369,593, 2,677,151, 2,677,152, 2,709,278 and 2,736,417 describe systems which have been invented in an attempt to improve slab casting and handling techniques. Some of these systems still leave much to be desired while others, though acceptable lack flexibility, are mechanically complex, require excessive floor space, and are very costly. Another method which is in use extrudes a ribbon of semisolidified mass of the desired width and thickness onto a conveyor belt submerged in cold water. After cooling sufficiently, the ribbon is cut into the desired lengths and subjected to additional cooling. While this is a continuous and comparatively simple method, it produces slabs of uneven shape which cause difficulty in stacking and packaging.

In known casting systems there has never been an integrated laminated slab-casting-cooling-stacking mechanism for handling hot melts such as chewing gum base and wax-elastomer compounds, wherein, hand labor is dispensed with and the slabs are produced and stacked in a continuous and uninterrupted flow entirely automatic.

Among the objects of this invention is the provision of relatively simple processes for converting a molten mass of viscous melt, particularly chewing gum base or wax-elastomer compounds, or any similar products or combinations of products, into laminated rectilinear slabs of any desired thickness. The apparatus described herein provides such process for handling those molten compounds which are found by testing to be compatible with the mechanism and principles employed. The mechanism described herein is a complete and integrated handling system in as much as it includes pumping, casting, conveying, cooling, sizing, scoring, drying, coating, folding, stacking, and discharging a fully loaded pallet rendered ready for packaging. Any combination of such steps and apparatus or machines may be employed.

Other objects of the invention will appear from the more detailed description set forth below, such description being illustrative, since various changes may be made therein by those skilled in the art without departing from the scope and spirit of the present invention.

In connection with that more detailed description, the drawing shows the following:

FIG. 1 is a schematic showing of that portion of a system for carrying out the present invention, beginning with extrusion of the ribbon and scoring for further operations.

FIG. 2 is a schematic showing of the remainder of the system for carrying out the invention including coating, accordion pleating, stacking and slab forming operations.

FIG. 3 is a detail of a coating unit for intermittent coating of the ribbon in relation to the scoring and accordion pleating operations.

FIG. 4 is a detail of a photoelectric control unit in the stacking operation.

The present invention is particularly directed to production of stacks of laminated slabs from hot viscous melts of chewing gum base compositions and wax compositions for use particularly in the chewing gum and wax compounding industries, but has wide utilization in any industry utilizing similar materials. The methods and apparatus set forth herein enable hot viscous melts of such materials to be solidified into laminated slabs of any desired thickness without the use of pans, trays or molds, or their equivalents, and to continuously discharge such slabs to form a laminated stack or a plurality of laminated slabs onto a pallet or pallets, skids or containers ready for packaging or other utilization.

Desirably the hot viscous melt is extruded into a ribbon of desired dimensions or desired thickness as for example up to three-eighths inch, though it may be substantially thicker or thinner, and is deposited upon a conveyor belt which travels through a temperature-controlled water bath. It desirably may contain enough residual heat to be pliable and where, as preferred, is converted into a laminated stack, the residual heat is sufficient to cause substantial adhesion of the laminations in the stack except where cleavage or parting planes are desired which are controlled as set forth below.

The hot viscous melt as just set forth represents the best mode of practicing the invention, generally speaking, but other methods of making compositions suitable for use herein such as by scraped surface heat-exchanger processing, may also be employed which do not require the production of hot viscous melts depending in part on the nature of the composition. Any method which utilizes a composition as set forth herein, and by mechanical working with or without heat and/or pressure, below the melting point of the composition as a whole, even though it may be above the melting point of a component thereof, may be employed.

It generally will have the properties of hot viscous melt compositions set forth herein at the stage where the latter are extruded into ribbon or sheet form. Thus, in general, it will desirably be in pliable condition for extrusion and for accordion pleating as set forth below, and adherent enough so that the folds will adhere upon contact to form the laminated stack; but if necessary, sufficient heat may be supplied for this purpose without melting the material. From thereon, the operation will follow that for hot viscous melts. The invention will be particularly illustrated by the process employing hot viscous melts, since other methods employing compositions of similar properties begin at the point of extrusion.

The ribbon thus formed is scored to produce segment indication, desirably by scoring alternately above and below the ribbon enabling an accordion-type folding operation to be carried out which results in material that is inherently and continuously self-stacking to form a laminated stack of configuration as desired, particularly rectilinear. Where the accordion folding for stack formation is conducted on a pallet placed on a self-leveling lift, the operation is readily performed so that when a predetermined height is reached, the pallet may be removed and replaced by an empty pallet.

Desirably the stacking may be to height greater than the length of slabs used in the industrial plant. In such cases, the laminations may be segregable at any intermediate point desired by producing cleavage or parting planes at predetermined levels. Desirably this may be done for example by nonadherent coating of intermittent laminations at equally spaced points in the vertical stack of laminations, or by insertion of nonadhesive sheets desirably of the size of the cross section of the stack, so that ultimate separation at the parting planes will produce laminated slabs of the size desired.

By indexing a pallet load and replacing it with an empty pallet positioned at the level of the lift to receive the continuously folding segments, the operation may readily be carried out without interrupting the flow or in any way interfering with the travelling ribbon of material. Thus the method of casting hot viscous melts into solidified laminated slab forms is carried out wherein the process is completely flexible in as much as the rectilinear dimensions and thickness may be quickly and easily changed for a variety of materials, with few parts and simple mechanisms, greatly reducing the cost of labor, equipment and floor space.

Referring now to the drawing which shows a perspective schematic view of one form of apparatus useful in performing the process of the invention, the molten material is pumped from holding pot 23 by pump 24 through jacketed pipe 25 to heated sheeting nozzle 1 which is sized to discharge the desired width and thickness of sheeted ribbon 2. The nozzle is mounted at one end of an open trough-type water tank 3 and set to deposit a fluid sheet of material onto the wetted surface of conveyor belt 4. The conveyor belt is submerged in water for the greater part of its length. It is elevated just above the level of the water as it passes under the nozzle. Cooling conditions are controlled by adjusting travel speeds and/or temperature instrumentation of the chill water. The sheeted material flows out of the nozzle and is case upon the belt in an endless and uninterrupted ribbon 2 preferably one-eighth to three-eighths- inch thick.

At the desired point downstream in the water tank, when the chilled ribbon of material is at the desired temperature and condition of the proper consistency and degree of solidity, the ribbon then may enter a pair of spring-loaded (not shown) squeeze rolls 5. The squeeze rolls serve to flatten or iron out any surface irregularities that might develop while cooling en route.

Immediately upon leaving the primary squeeze rolls 5, the ribbon desirably enters a pair of scoring rolls 6a, 6b and each roll has means for scoring the ribbon to impress grooves laterally across the ribbon at regular intervals. The spacing of the lateral grooves is determined by the desired slab dimension. The grooves are impressed upon the ribbon alternately on top and bottom sides as shown in FIGS. 1 and 2 of the drawing. Rolls 6a and 6b continue rotation of ribbon 2, clockwise rotation of roll 6b and counterclockwise rotation of roll 6a to continue the forward movement of ribbon 2. Each of rolls 6a and 6b has an anvil blade 6c and a scoring blade 6d set 180° apart on the surface of each roll and extending transversely across the roll at right angles to the ribbon. The position of the anvil blades and scoring blades are set with respect to each other so that rotation of rolls 6a and 6b brings a respective scoring blade on one roll and anvil blade on the other alternately into juxtaposition on opposite sides of ribbon 2 thereby to give a ribbon scored alternately on opposite sides as shown in FIG. 2 for purposes hereinafter set forth.

The power supply and connections for operations in scoring are illustrated in FIG. 1. Motor 16 desirably of varidrive type, drives gear 16i and thus gear 16j which in turn moves gears 16k and 16l that deliver power to scoring rolls 6b, 6a. From roll 6b, gear 16m actuates chain link 16n which moving over gears 16o, 16p, 16q, and 16r successively delivers the necessary power through gear 16o to lower squeeze roll 5, through gear 16s via gear 16t to conveyor belt 4, through gear 16u to upper squeeze roll 5, through gears 16v and 16w to upper secondary squeeze roll 7a, through gears 16r and 16x to lower secondary squeeze roll 7b.

Ribbon 2 is now segmented and any surface irregularities developed in scoring have been removed by secondary squeeze rolls 7, the ribbon then passing under air jet S to sweep away and/or evaporate any trace of water droplets.

A short conveyor belt 9 delivers the scored ribbon to a coating unit 10 as shown in FIGS. 1 and 2, and in detail in FIG. 3.

The coating unit is actuated intermittently at a predetermined interval to apply a suitable and compatible coating on the top surface of a delineated segment which coating will not adhere when the coating segment is caused to fold with its surface in contact with another segment. The interval of coating will depend on the desired height of the slab. In lieu of sprayed or applied coating, formed in situ, a separate parting sheet of nonadherent paper or polyethylene or other plastic may be applied as separators, depending on the characteristics of the material being handled. Such parting sheet may be for one or two segments of the ribbon so that when folded over, one segment length is made nonadherent to form a parting plane.

Where separate parting sheets are thus applied to form parting planes, such sheets may be fed from any type of machine or unit commonly used in commercial printing operations for delivering a sheet from a stack or magazine to a bed on which printing is carried out. Here there is no printing and the sheet composed as set forth above. The unit stands adjacent the travelling ribbon to place the parting sheet on position on the ribbon. This operation may be carried out by submitting the sheet-delivering unit for the coating unit, at approximately the same relative position adjacent air jet 8 and the accordion pleating zone. A small platform 10q placed beneath belt 9 at the sheet delivery point may serve to support the belt at the time of delivery of the sheet.

These coatings or sheets of paper or plastic or film or other material provide parting planes and form the boundaries of the slabs. All other but terminal segment surfaces in a slab remain uncoated and with proper temperature control, can be made adhesive so that succeeding segments, when folded, become welded on contact to make up any thickness or height desired, the latter being determined by the parting planes.

Any type of coating operation may be utilized for example by spray of liquid or application by a powder-type distributor. The illustration here may be desirably made with a solid powdered coating substance that is distributed directly on the surface of a segment of the ribbon, and forms a nonadhesive surface.

The type of coating material or parting composition employed, depends in part on the nature of the composition of the extruded sheet to be parted. A calcium carbonate slurry for example is satisfactory on gum base material. See U.S. Pat. No. 2,284,804.

Coating unit 10, may supply coating material as shown in FIGS. 1, 2 and 3, from storage trough 10a of triangular cross section having sloping sidewalls 10b which direct powder or other coating material 10c in trough 10a downwardly toward perforated trough shaped channeled bottom 10d, the sidewalls serving to assist in keeping the powder flowing. Directly above the perforated bottom, an agitator (not shown) agitates the powder within channeled bottom 10d so that the powder or other material flows through the bottom of the unit and deposits on the surface of one segment of ribbon 2, where it dries or sets to a nonadherent surface. A deflector 101 directs the flow of powder or slurry as desired.

The coating unit may be a commercially available spreader such as a so-called lime spreader, equipped with pulley 10a mounted on extension 10f of the agitator rod (not shown) and driven by belt 10g from pulley 10h on motor shaft 10j of motor 10k. Desirably, the device should provide free flow of the powder or slurry, and additional holes may be provided in the bottom if necessary. As shown in FIG. 3, which illustrates a commercially available spreader of the type mentioned above, such devices are utilizable here.

Cam 29 operated by upper scoring roll 6a controls two oppositely located time delay switches 30, one switch 30a controls three-way solenoid valve 28 and retractable pins 27, pneumatically, at the sheeting nozzle end of tank 3 which pins may be used to divide ribbon 2 longitudinally to produce the size of the stack in one dimension such as the width. The other switch 30b may control the coating mechanism. The initiation of the coating operation may be started by closing an electric circuit at the scoring roll unit pneumatically and after a desired number of revolutions of scoring roll 6a or 6b.

The power is obtained from electric motor 10k which may be mounted conveniently for rotating pulley 10h, with drive belt 10g from pulley 10h driving pulley 10e to rotate the agitator within channel 10d. The power to motor 10h is operated when the desired ribbon passes under coating unit 10 and is cut off when the ribbon 2 has traversed a segment length beneath coating unit 10.

After passing the intermittent coating unit, the segmented ribbon 2 leaves the end of conveyor belt 9 and falling vertically is allowed to drape onto a positioned skid, pallet, or container 11. The aforementioned alternates scoring causes the draped ribbon of material to alternately fold in accordion fashion.

For direct pallet loading, which may require for example building a stack 4 to 5 feet high, it is necessary to change position vertically as the stack builds up. This is desirably accomplished with a self-leveling lift 12 of conventional type where the sink rate is adjusted to match the stack buildup.

When the material is stacked to the desired height, the pallet load is indexed horizontally at a synchronized speed and a distance equal to two segment lengths whereupon an empty pallet is positioned on the uppermost level and a new stack is begun. This transition is made without interruption.

It may readily be observed that for pallet loading, the ribbon may be extruded the width of any pallet. The drawing illustrates a ribbon divided into three strips. Any number of divisions or strips may be accomplished by simply dividing the flow at the nozzle exit with suitable fingers 13. These fingers are made retractable so that they may be actuated on a timed cycle to retract momentarily to allow the production of welds between strips at regular intervals.

The welds serve to control the multiple strips and maintain alignment as they travel through the water bath. The welds, also, serve to stabilize the completed pallet load wherein the individual stacks, which make up the pallet, are joined as frequently as is necessary by these stack welds to achieve the desired stability.

Referring again to the drawings, in the buildup of stack S, the lift 12 gradually sinks until it is at floor level at which time the stack is at desired height and is slid from lift 12 onto a roller conveyor 38 by transfer units 20, 20. Simultaneously an empty pallet is moved into position from pallet magazine 21 onto the vacant lift. For this operation pallet magazine 21 is normally placed adjacent lift 12 with magazine 21 positioned so that an empty pallet may be slid off the support onto lift 12. Roller conveyor 38 is adjacent to the loaded lift in the latter's lowermost or floor position to receive the loaded pallet, the magazine 21, lift 12, and roller conveyor 38 being aligned in their normal position for this operation. Two transfer units 20 carry out these operations. Thus, units 20 are normally placed, one on each side of and adjacent to the aligned pallet magazine 21, lift 12, and roller conveyor 38.

Assuming that empty pallet 11 is on elevator 12, and sheeted material 2 is folding on the pallet, the elevator 12 descends at the rate determined by photoelectric sensing device 34 which in turn is controlled by sprocket chain 35 and variable speed DC gear motor 36. The rate of descent is such that folding is performed at approximately the same level regardless of the amount of material already loaded on the pallet. At the moment of folding the material on the pallet, transfer flaps 19 are closed about the stack for the purpose of correcting any misalignment in the folded material and later to transfer the pallet when completely loaded from elevator 12 to roller conveyor 38.

At the end of descent, elevator 12 engages limit switch 31 which controls the motion of transfer unit 20. At this moment, air-operated pallet-carrying pins 17, engages empty pallet from magazine 21 and support shelf 18 opens up to support continuous ribbon 2 while the pallets are in transfer.

At the end of the forward stroke of carriage 20, elevator 12 starts its upward motion while carrying pins 17 support the pallet which is partially loaded until the elevator is available to take over. Simultaneously, air-operated flaps 19 open and the carriage or transfer unit 20 starts its return stroke until it engages limit switch 32 which senses that carriage 20 has returned to its original position. After this, the cycle repeats.

While the schematic drawing shows the pinion as a self-sustaining unit, it may desirably be mounted on a rigid frame along with reversible motor 26, these elements functioning to reciprocate the transfer unit only.

As described herein, a novel method of and machine for casting hot viscous melts into laminated slab forms has been provided which not only produces uniform slabs but which also stacks such slabs entirely automatically, and continuously, eliminating pans and molds, greatly reducing the cost of labor, equipment and floor space required with heretofore known casting processes.

The surface speeds of the rollers and conveyor belts are synchronized and driven by a common power unit. The power unit is equipped with a variable speed control so that speeds may readily be adjusted to match material feed rates as well as sheet thickness and cooling rates for a variety of formulations. For each thermoplastic material, a certain combination of speed, thickness and temperatures would be determined to give the desired results.

For example, a thermoplastic formulation, consisting of 5 percent Elastomer, 30 percent Resin, 30 percent Plasticizer, 15 percent Filler, and 30 percent Natural Gum, was cast under the following conditions. The hot melt was delivered to the sheeting nozzle at 250° F. The conveyor belt was set to travel beneath the nozzle at 15 to 20 feet per minute. At this speed, material was deposited approximately three-sixteenth inch thick and carried thru a water bath approximately 16 feet long with water temperature maintained at 80° F. The scoring rolls were set to impress a groove approximately one-eighth inch deep.

Under the conditions given above as exemplary, the system discharges the above formulation with the proper degree of flexibility and the right amount of surface tackiness. This resulted in the production of a neat self-folding ribbon of material which laminated into a stack configuration endlessly and automatically. For a given material, an optimum combination of settings exist which must be found by experimentation. Too high a speed for a given length and temperature water bath may result in an insufficiently cooled sheet which may lack the rigidity to fold as well as desired. Conversely, too low a speed, under the same conditions, may result in a product too brittle to fold without cracking and breaking as well as loss of adhesion for laminating purposes. The speed should therefor be adjusted for each formulation to give a sheet cooled to a rigidity to fold properly without cracking or breaking and an adhesion for proper lamination.

An alternate means of cooling could be used in cases where it is undesirable for water to come in contact with the material to be cooled. A stainless steel bolt, the underside of which is cooled by sprays or water bed, may be substituted in such cases.

The product, produced by this equipment, is essentially a cast block of material, rectilinear in shape, which is formed without pans or molds or hand labor. The blocks are formed by laminating successive layers, relatively thin in section, at controlled temperatures, such that layers adhere one to the other to form a stack of solid blocks of any desired thickness and planned form endlessly. The stacked material is dismantled into uniform blocks. Dismantling is facilitated by prepainting or coating or interpositioning a parting sheet of paper, plastic or other sheet material at regular intervals before folding. The painted interface provides a cleavage plane and forms the boundary and vertical dimension of each block.

The following examples illustrate various types of thermoplastic formulations that may be delivered in molten condition at temperatures varying, for example, from about 120° to 400° F. depending upon physical characteristics, such as melting point, softening point, viscosity and penetration, to the nozzle of the machine. The temperature at which the sheeted or corrugated material is delivered to the rolls depends upon formulation and thickness desired. This may usually vary from about 70° to 120° F.

The examples given below are merely illustrative of the types of materials and formulations that may be treated with the invention. The examples do not, in any way, limit the formulations of thermoplastics which may be so treated.

|  | I | II | III | IV | V |
|---|---|---|---|---|---|
| Microcrystalline wax | 100% | 70% | 30% | 10% | |
| Elastomer* | | 30% | 30% | 20% | 5% |
| Resins** | | | 30% | 535% | 30% |
| Plasticizers | | | 10% | 20% | 20% |
| Fillers | | | | 15% | 15% |
| Natural Gums*** | | | | | 30 |
| Totals: | 100% | 100% | | 100% | 100 |

\* May be natural rubber, butyl, vixtanex, SBR, etc.

\*\* Natural and/or synthetic

\*\*\* Usually high resin, low gutta hydrocarbon naturally occuring gums, collected as latices exudating from tropical trees and coagulated prior to final purification and compounding.

Any other type ribbon-forming, scoring, smoothing, coating, accordion pleating, stacking, partition forming or other operations and machines may be utilized besides these set forth here which latter serve only to illustrate the invention. Manual or combined manual and automatic operations may be used that function to the same ends, but desirably a continuous automatic operation is employed and gives the greatest advance.

I claim:

1. A slab of chewing gum base comprising a stack of rectilinear layers of said base, adjacent faces of said layers being welded together, said layers additionally being joined by folds at alternate opposite ends of said layers and having been formed as a single continuous ribbon of said base.

2. A slab according to claim 1 including at least one additional ribbon of said base joined to a side edge of said continuous ribbon of said base.

3. A plurality of slabs according to claim 1, said slabs being separated by a layer of nonadherent material between two adjacent layers in said stack.

* * * * *

UNITED STATES PATENT OFFICE
CERTIFICATE OF CORRECTION

Patent No. 3,644,169                     Dated February 22, 1972

Inventor(s)  Michael Phillips

It is certified that error appears in the above-identified patent and that said Letters Patent are hereby corrected as shown below:

In Column 1, line 16, "customer's" should read --customers'--; line 34, "slots" should read --slabs--.
In Column 3, line 29, "case" should read --cast--.
In Column 4, line 20, "submitting" should read --substituting--; line 58, "10a" should read --10e--.
In Column 5, line 11, "alternates" should read --alternate-
In Column 6, line 52, "bolt" should read --belt--; line 63, "sheet" should read --sheeted--.
In Column 7, line 10, "535%" should read --35%--; line 13, "30" should read --30%--; in line 14, "100" should read --100%--.
In Column 8, line 3, "these" should read --those--.
Under references cited, inventor of U. S. Patent No. 2,284,804 should read "DeAngelis".

Signed and sealed this 29th day of August 1972.

(SEAL)
Attest:

EDWARD M.FLETCHER,JR.
Attesting Officer

ROBERT GOTTSCHALK
Commissioner of Patents